(12) United States Patent
Kim et al.

(10) Patent No.: US 11,360,356 B2
(45) Date of Patent: Jun. 14, 2022

(54) LIQUID CRYSTAL DISPLAY DEVICE

(71) Applicant: LG Display Co., Ltd., Seoul (KR)

(72) Inventors: Won-Taeck Kim, Paju-si (KR); Kyung-Su Ha, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/920,592

(22) Filed: Jul. 3, 2020

(65) Prior Publication Data

US 2021/0011345 A1     Jan. 14, 2021

(30) Foreign Application Priority Data

Jul. 12, 2019    (KR) ........................ 10-2019-0084398

(51) Int. Cl.
    *G02F 1/1343*      (2006.01)

(52) U.S. Cl.
    CPC .. *G02F 1/134336* (2013.01); *G02F 2201/122* (2013.01); *G02F 2201/123* (2013.01)

(58) Field of Classification Search
    CPC ......... G02F 1/134336; G02F 1/133707; G02F 1/134372; G02F 1/134309; G02F 1/136227
See application file for complete search history.

(56) References Cited

U.S. PATENT DOCUMENTS

| | | | |
|---|---|---|---|
| 2015/0085233 A1* | 3/2015 | Kim ................. | G02F 1/134336 349/110 |
| 2017/0017128 A1 | 1/2017 | No et al. | |
| 2018/0335678 A1 | 11/2018 | Lee et al. | |
| 2019/0035825 A1* | 1/2019 | Huang ................ | H01L 27/1259 |
| 2019/0146287 A1 | 5/2019 | Matsushima | |

FOREIGN PATENT DOCUMENTS

| | | |
|---|---|---|
| CN | 104280946 A | 1/2015 |
| CN | 107728390 A | 2/2018 |
| KR | 10-0678738 B1 | 2/2007 |

(Continued)

OTHER PUBLICATIONS

Translation into English of Korean Patent Application Publication No. KR20180072262. Application published on Jun. 29, 2018. Translation downloaded from the European Patent Office website at http://https://worldwide.espacenet.com. Translation performed by Google Translation tool on the website. (Year: 2018).*

(Continued)

*Primary Examiner* — Angela K Davison
(74) *Attorney, Agent, or Firm* — Polsinelli PC

(57) ABSTRACT

A liquid crystal display device includes a first substrate and a second substrate facing each other; a thin film transistor in a pixel region on the first substrate; a first electrode on the thin film transistor; and a second electrode on the first electrode and connected to the thin film transistor, wherein the second electrode includes a first rib electrode and a second rib electrode, wherein the first rib electrode and the second rib electrode are connected by a connection electrode, wherein a vertical opening is between the first rib electrode and the second rib electrode and along a first direction, and wherein the connection electrode includes a hole at a region adjacent to the vertical opening.

12 Claims, 11 Drawing Sheets

(56) References Cited

FOREIGN PATENT DOCUMENTS

| KR | 10-2018-0072262 A | 6/2018 |
|----|-------------------|--------|
| TW | 200909921 A | 3/2009 |
| TW | 201415139 A | 4/2014 |
| TW | 201516521 A | 5/2015 |

OTHER PUBLICATIONS

European Search Report dated Sep. 11, 2020 issued in Patent Application No. 20183930.5 (11 pages).
Taiwanese Office Action dated Mar. 8, 2021 issued in corresponding Patent Application No. 109122618 w/English Translation (11 pages).

* cited by examiner

LIQUID CRYSTAL DISPLAY DEVICE

CROSS-REFERENCE TO RELATED APPLICATION

The present application claims the priority benefit of Korean Patent Application No. 10-2019-0084398 filed on Jul. 12, 2019, which is hereby incorporated by reference in its entirety.

BACKGROUND

Field of the Disclosure

The present disclosure relates to a liquid crystal display (LCD) device. More particularly, the present disclosure relates to an LCD device which can stably maintain a high response speed.

Discussion of the Related Art

An LCD device includes an LCD panel including an array substrate in which thin film transistors are formed, a color filter substrate in which red, green and blue color filter patterns are formed, and a liquid crystal layer between the array substrate and the color filter substrate, and a backlight unit supplying a light to the LCD panel.

An alignment of liquid crystal molecules having a polarization property changes according to a voltage applied to the thin film transistor in the LCD panel, and a transmittance of a light emitted from the backlight unit by the liquid crystal molecules having an optical anisotropy, and thus an image is displayed.

A response speed of the LCD device is defined by a total time when a light transmittance changes between 10% and 90%. However, since the liquid crystal molecules have viscosity and thus an alignment of the liquid crystal molecules are determined only by a dielectric rotation force, the response speed of the LCD device is low, and a still image phenomenon that an image of a current frame and an image of an immediately previous frame appear to overlap when viewed is produced.

Accordingly, an LCD device is required to realize a high response speed, and to have no reduction of a response speed even when a driving time increases.

SUMMARY

Accordingly, the present disclosure is directed to an LCD device that substantially obviates one or more of the problems due to limitations and disadvantages of the prior art.

The present disclosure provides an LCD device that can have a high response speed and stably maintain a high response speed.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present disclosure, as embodied and broadly described herein, a liquid crystal display device includes: a first substrate and a second substrate facing each other; a thin film transistor in a pixel region on the first substrate; a first electrode on the thin film transistor; and a second electrode on the first electrode and connected to the thin film transistor, wherein the second electrode includes a first rib electrode and a second rib electrode, wherein the first rib electrode and the second rib electrode are connected by a connection electrode, wherein a vertical opening is between the first rib electrode and the second rib electrode and along a first direction, and wherein the connection electrode includes a hole at a region adjacent to the vertical opening.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure. In the drawings.

DETAILED DESCRIPTION

Reference will now be made in detail to aspects, examples of which are illustrated in the accompanying drawings. The same or like reference numbers may be used throughout the drawings to refer to the same or like parts.

Figure 1:
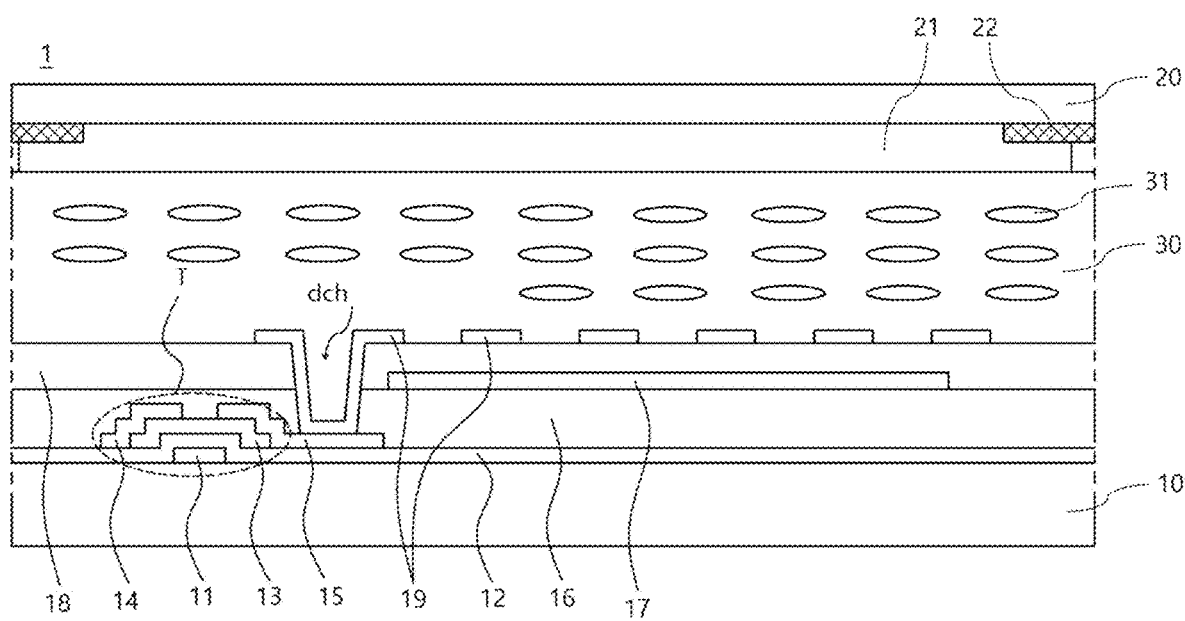
FIG. 1 is a cross-sectional view illustrating an LCD device according to an aspect of the present disclosure.

FIG. 1 is a cross-sectional view illustrating an LCD device according to an aspect of the present disclosure.

Referring to FIG. 1, the LCD device 1 of an aspect of the present disclosure may include a first substrate 10 on which a thin film transistor T is formed, a second substrate 20 on which a color filter 21 is formed, and a liquid crystal layer 30 between the first and second substrates 10 and 20.

A plurality of gate lines (not shown) and a plurality of data lines (not shown) may be formed on the first substrate 10. The gate lines may be spaced apart from and in parallel with one another, and the data lines may be spaced apart from and in parallel with one another, and cross the gate lines to define a plurality of pixel regions.

The gate line may be connected to a gate electrode 11 on the first substrate 10. A gate insulating layer 12 may be formed on and cover the gate electrode 11. The gate insulating layer 12 may be formed entirely over the first substrate 10.

A semiconductor layer 13 may be formed on the gate insulating layer 12 corresponding to the gate electrode 11 and a peripheral region surrounding the gate electrode 11. A source electrode 14 and a drain electrode 15 may be formed on both side portions of the semiconductor layer 13, respectively.

The gate electrode 11, the semiconductor layer 13, the source electrode 14 and the drain electrode 15 may form the thin film transistor T. The thin film transistor T may be located each pixel region.

The source electrode 14 may be connected to the data line. A first insulating layer 16 may be formed on the thin film transistor T. The first insulating layer 16 may be formed entirely over the first substrate 10.

A first electrode 17 may be formed on the first insulating layer 16 in each pixel region. A second insulating layer 18 may be formed on the first insulating layer 16 and the first electrode 17. The second insulating layer 18 may be formed entirely over the first substrate 10.

A drain contact hole dch may be formed in the first and second insulating layers 16 and 18 to expose the drain electrode 15 of the thin film transistor T.

A second electrode 19 may be formed on the second insulating layer 18 in each pixel region. The second electrode 19 may be connected to the drain electrode 15 through the drain contact hole dch.

The color filter 21 may be formed below the second substrate 20 (or on an inner surface of the second substrate 20). The color filters 21 respectively having red, green and blue pigments may be arranged in respective pixel regions. A black matrix 22 may be located between neighboring color filters 21.

Polarization plates (not shown) may be respectively attached onto outer surfaces of the first and second substrates.

The liquid crystal layer 30 includes liquid crystal molecules 31. An alignment of the liquid crystal molecules 31 may change according to an electric field produced by the first and second electrodes 17 and 19 and adjust a transmittance of a light supplied from a backlight unit (not shown). The liquid crystal molecules 31 may be positive type liquid crystal molecules having a positive dielectric anisotropy (+Δε), or negative type liquid crystal molecules having a negative dielectric anisotropy (−Δε).

An alignment layer (not shown) may be formed on each of the first and second substrates 10 and 20 while contacting the liquid crystal layer 30. The alignment layer may have an alignment axis of 0 or 90 degrees angle.

When a gate on voltage is applied to the thin film transistor T through the gate line, the thin film transistor T is turned on, and a voltage which is required according to a given brightness in a frame is transferred to the second electrode 19 through the data line and the thin film transistor T.

Accordingly, an electric field (or a fringe field electric field) is produced between the first electrode 17 and the second electrode 19 which the second insulating layer 18 is located between. The electric field may include an in-plane electric field component and a vertical electric field component. An alignment of the liquid crystal molecules 31 changes by the electric field, and a wide viewing angle can be achieved and color property and transmittance can be improved.

The second electrode 19 may have various structures, which are explained below.

Figure 2:
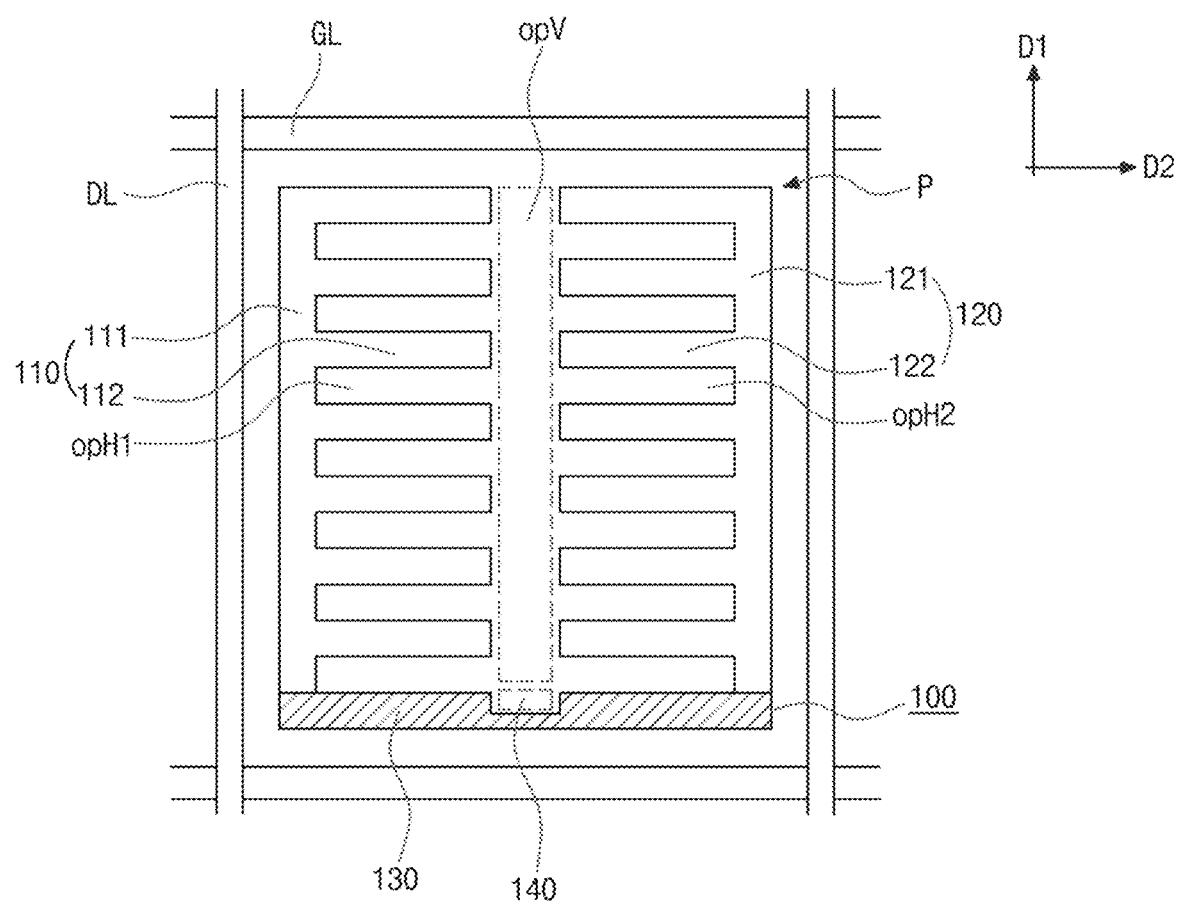
FIG. 2 is a plan view illustrating a second electrode of an LCD device according to a first aspect of the present disclosure.

FIG. 2 is a plan view illustrating a second electrode of an LCD device according to a first aspect of the present disclosure.

Referring to FIG. 2, a data line DL extending along a first direction D1 and a gate line GL extending along a second direction D2 crossing the first direction D1 may define a pixel region P.

A second electrode 100 may be formed in each pixel region P, and may include a first rib electrode 110, a second rib electrode 120 and a connection electrode 130.

The first rib electrode 110 may include a first vertical electrode 111 and a plurality of first horizontal electrodes 112, and ends of the plurality of first horizontal electrodes 112 may be connected to the first vertical electrode 111.

The first vertical electrode 111 may extend along the first direction D1, and the first horizontal electrodes 112 may extend along the second direction D2.

A plurality of first horizontal openings opH1 may be formed between the plurality of first horizontal electrodes 112. The plurality of first horizontal openings opH1 may extend along the second direction D2.

The first vertical electrode 111 and the plurality of first horizontal electrodes 112 may each have a rectangular bar shape. Thus, the plurality of first horizontal openings opH1 may each have a rectangular bar shape.

The second rib electrode 120 may include a second vertical electrode 121 and a plurality of second horizontal electrodes 122, and ends of the plurality of second horizontal electrodes 122 may be connected to the second vertical electrode 121.

The second vertical electrode 121 may extend along the first direction D1, and the second horizontal electrodes 122 may extend along the second direction D2.

A plurality of second horizontal openings opH2 may be formed between the plurality of second horizontal electrodes 122. The plurality of second horizontal openings opH2 may extend along the second direction D2.

The second vertical electrode 121 and the plurality of second horizontal electrodes 122 may each have a rectangular bar shape. Thus, the plurality of second horizontal openings opH2 may each have a rectangular bar shape.

Each one of the plurality of first horizontal electrodes 112 may be arranged to face corresponding one of the plurality of second horizontal electrodes 122. Accordingly, each one of the plurality of first horizontal openings opH1 may be arranged to face corresponding one of the plurality of second horizontal openings opH2.

A vertical opening opV may be formed between the plurality of first horizontal electrodes 112 and the plurality of second horizontal electrodes 122. The vertical opening opV may extend along the first direction D1.

The first rib electrode 110 and the second rib electrode 120 may be symmetrical with respect to the vertical opening opV as a center axis for symmetry.

The connection electrode 130 may be located between the first rib electrode 110 and the second rib electrode 120.

The connection electrode 130 may be connected to an end of the first vertical electrode 111 and an end of the second vertical electrode 121. The connection electrode 130 may be connected to the drain electrode (15 of FIG. 1) of the thin film transistor (T of FIG. 1) through the drain contact hole (dch of FIG. 1).

In FIG. 2, the connection electrode 130 located at a lower-side portion of the pixel region P is shown by way of example. However, the connection electrode 130 may be located at an upper-side portion of the pixel region P. Further, the first vertical electrode 111 and the second vertical electrode 121 may be formed to extend along the second direction D2, and in this case, the connection electrode 130 may be located at a left-side or right-side portion of the pixel region P to connect the first vertical electrode 111 with the second vertical electrode 121.

A hole 140 may be formed in the connection electrode 130. The hole 140 may be located at a region adjacent to the vertical opening opV.

The hole 140 may be connected to the vertical opening opV, and may have one of various shapes, for example, a rectangular shape, trapezoidal shape, triangular shape, other polygonal shape, circular shape, semicircular shape, or a geometrical shape having rounded corners or angular corners.

When displaying a full white from the LCD device, a transmittance of a light, which is emitted from the backlight unit and then passes through the polarization plate attached onto the first substrate (10 of FIG. 1), the liquid crystal layer (30 of FIG. 1) and the polarization plate attached onto the second substrate (20 of FIG. 1), may be considered as 100%. A time when a light transmittance changes between 10% and 90% may be defined as a response speed of the LCD device.

Regarding the response speed of the LCD device, a rising time may be defined as a time when an alignment of the liquid crystal molecules changes so that a light transmittance changes from 10% to 90%, and a falling time may be defined as a time when an alignment of the liquid crystal molecules restores to an initial state so that a light transmittance changes from 90% to 10%.

The present disclosure may reduce the falling time of the LCD device and improve the response speed, which is explained with reference to FIGS. 3A and 3B.

Figure 3A:
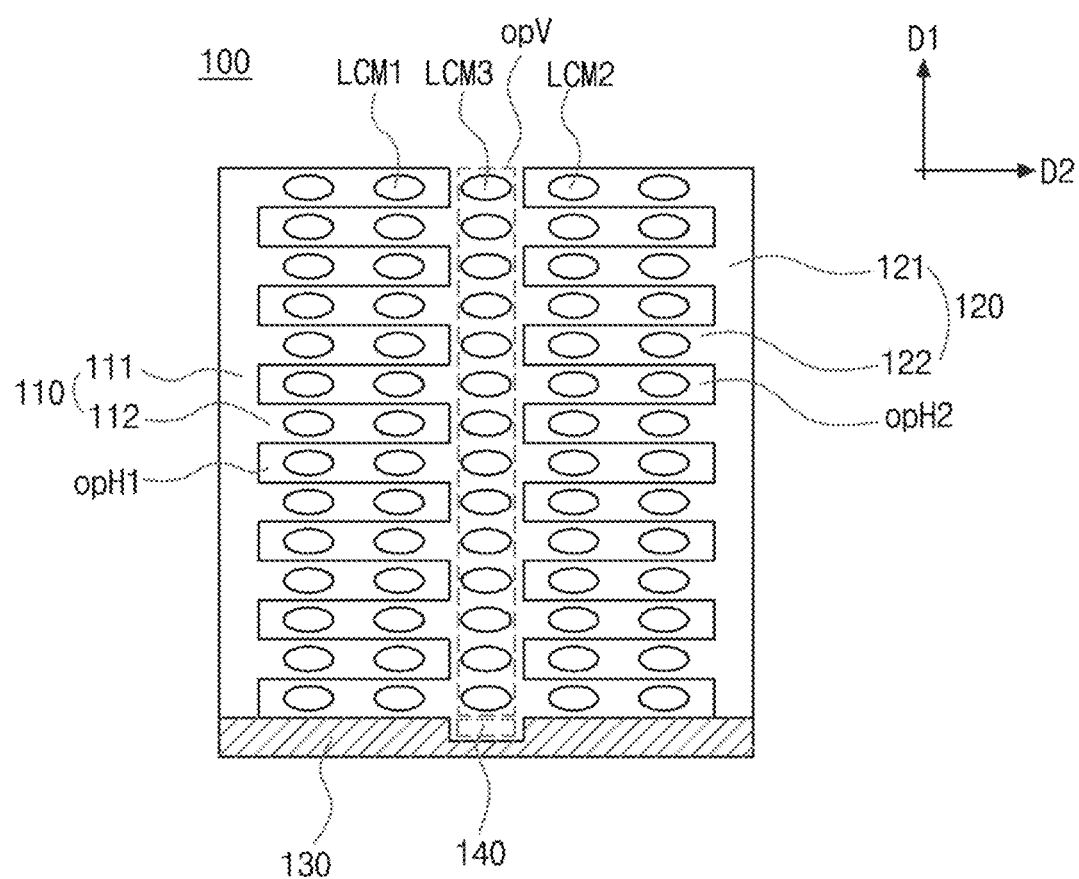
FIG. 3A is a view illustrating an initial alignment of liquid crystal molecules over a second electrode.
Figure 3B:
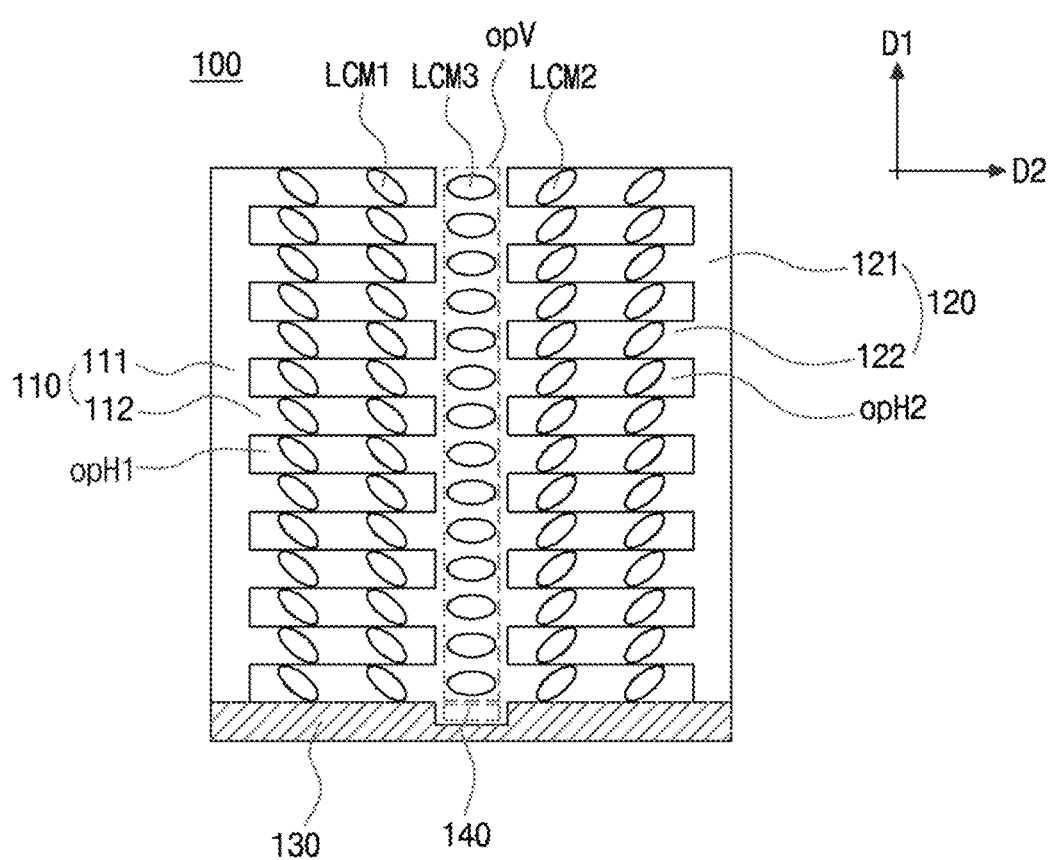
FIG. 3B is a view illustrating an alignment of liquid crystal molecules over a second electrode when a voltage is applied.

FIG. 3A is a view illustrating an initial alignment of liquid crystal molecules over a second electrode, and FIG. 3B is a view illustrating an alignment of liquid crystal molecules over a second electrode when a voltage is applied.

In FIGS. 3A and 3B, positive type liquid crystal molecules 31 having a positive dielectric anisotropy (+ΔE) are shown by way of example, but it is not limited.

In FIG. 3A, first liquid crystal molecules LCM1 may be located corresponding to the first rib electrode 110, second liquid crystal molecules LCM2 may be located corresponding to the second rib electrode 120, and third liquid crystal molecules LCM3 may be located corresponding to the vertical opening opV.

In an initial alignment state, major axes of the positive type first to third liquid crystal molecules LCM1 to LCM3 may be aligned along the second direction D2.

In FIG. 3B, when a voltage is applied to the second electrode 100, since the first and second rib electrodes 110 and 120 are symmetrical with respect to the vertical opening opV as an axis for symmetry, an electric field from the first rib electrode 110 may be different from an electric field from the second rib electrode 120. Accordingly, a rotation direction of the first liquid crystal molecules LCM1 may be different from a rotation direction of the second liquid crystal molecules LCM2.

The electric fields from the first and second rib electrodes 110 and 120 may be different from each other, an equilibrium of electric field may be established at the vertical opening opV as a boundary between the first and second rib electrodes 110 and 120. Accordingly, the third liquid crystal molecules LCM3 may not be rotated but may maintain an initial alignment state.

When no voltage is applied and the first and second liquid crystal molecules LCM1 and LCM2 try to restore to the initial alignment state, a restoration force may be improved by the third liquid crystal molecules LCM3 maintaining the initial alignment state.

The electric fields produced by the first and second rib electrodes 110 and 120 may be in equilibrium at the vertical opening opV so that a declination line where an alignment of liquid crystal molecules does not change may be produced at the vertical opening opV. Accordingly, a restoration force of the first and second liquid crystal molecules LCM1 and LCM2 may be improved, and thus a falling time when liquid crystal molecules return to an initial alignment state may be reduced.

However, when the plurality of first and second horizontal electrodes 112 and 122 are not the same in shape and size, electric fields on the first and second rib electrodes 110 and 120 are not produced uniformly.

By a difference of electric fields on the first and second rib electrodes 110 and 120, electric fields on the vertical opening opV may not be in equilibrium but may be biased toward the first rib electrode 110 or the second rib electrode 120.

Figure 4A:
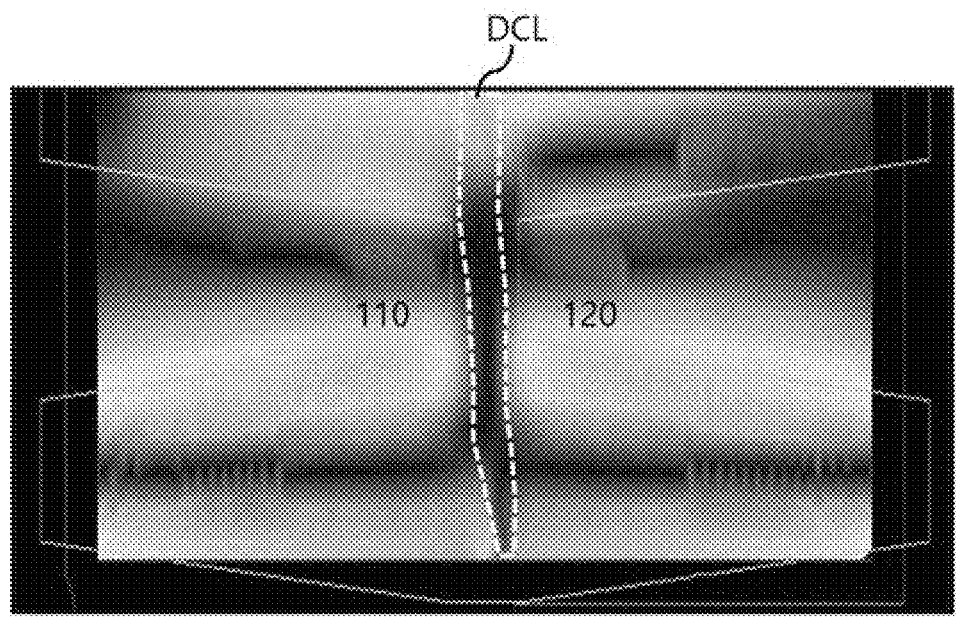
FIG. 4A is a view illustrating a declination line when a driving time to apply a voltage to a second electrode including no hole increases.

FIG. 4A is a view illustrating a declination line when a driving time to apply a voltage to a second electrode including no hole increases. In FIG. 4A, it is seen that electric fields are not in equilibrium on the vertical opening opV and thus a declination line DCL is biased.

As a time to apply a voltage to the second electrode (100 of FIG. 3b) increase, an electric field is biased, and thus a declination line DCL adjacent to the connection electrode (130 of FIG. 3B) may move close to one of the first rib electrode 110 and the second rib electrode 120. For example, as shown in FIG. 4A, the declination line DCL may move toward the second rib electrode 120.

In the case that the third liquid crystal molecules (LCM3 of FIG. 3B) forming the declination line DCL move toward the first or second rib electrode (110 or 120 of FIG. 3B), when a voltage for the second electrode (100 of FIG. 3B) is blocked, a restoration force of the first liquid crystal molecules (LCM1 of FIG. 3B) or the second liquid crystal molecules (LCM2 of FIG. 3B) may be reduced. Accordingly, a reduction of a falling time may not be achieved properly.

In the present disclosure, as shown in FIGS. 2, 3A and 3B, the connection electrode 130 may include the hole 140 adjacent to the vertical opening opV.

The hole 140 may increase a length of a side of the connection electrode 130, and thus regions to produce an electric field in the second electrode 130 may increase. Further, an electric field may be produced at the hole 140 so that an intensity of an electric field may increase. Thus, an electric field may expand to a center region of the first and second horizontal electrodes 112 and 122.

Figure 4B:
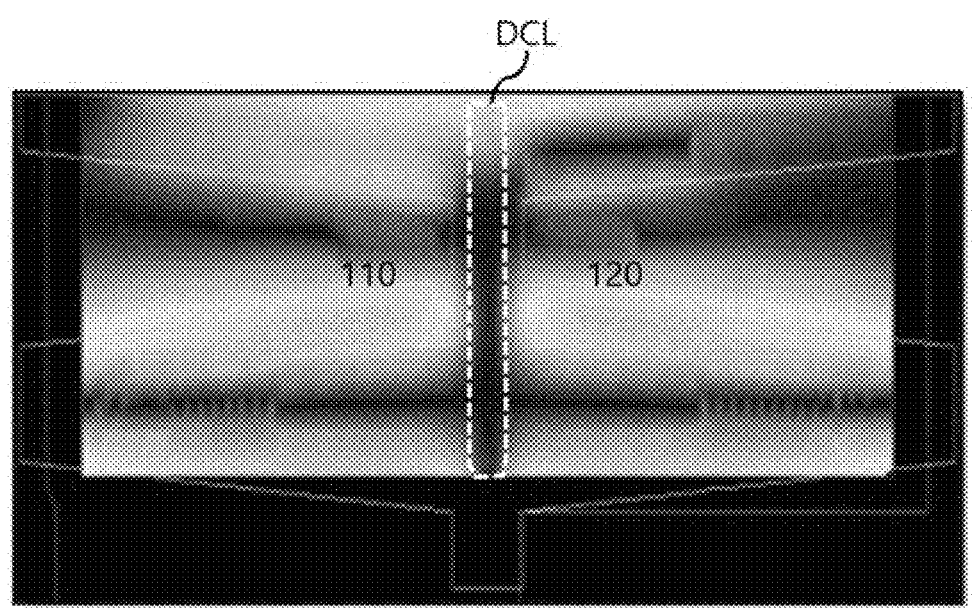
FIG. 4B is a view illustrating a declination line when a driving time to apply a voltage to a second electrode including a hole increases according to a first aspect.

FIG. 4B is a view illustrating a declination line when a driving time to apply a voltage to a second electrode including a hole increases according to a first aspect. In FIG. 4, it is seen that a declination line DCL is not biased toward the first or second rib electrode 110 or 120 but remains constant.

As described above, in this aspect, the connection electrode 130 may include the hole 140, and thus an electric field between the first rib electrode 110 and the second rib electrode 120 remain in equilibrium over the vertical opening opV. Accordingly, even though a time to apply a voltage to the second electrode 100 increase, the third liquid crystal molecules LCM3 forming the declination line DCL may not move to one of the first and second rib electrodes 110 and 120 but may remain in position, and a restoration force of the first and second liquid crystal molecules LCM1 and LCM2 may remain, and thus a falling time to return to an initial alignment state may be reduced effectively.

As such, the LCD device of this aspect may reduce the falling time and thus improve the response speed, and thus the LCD device may be applied to a device requiring a high response speed, for example, display device for a video game, a display device for a virtual reality, a mirrorless vehicle, or the like.

Figure 5:
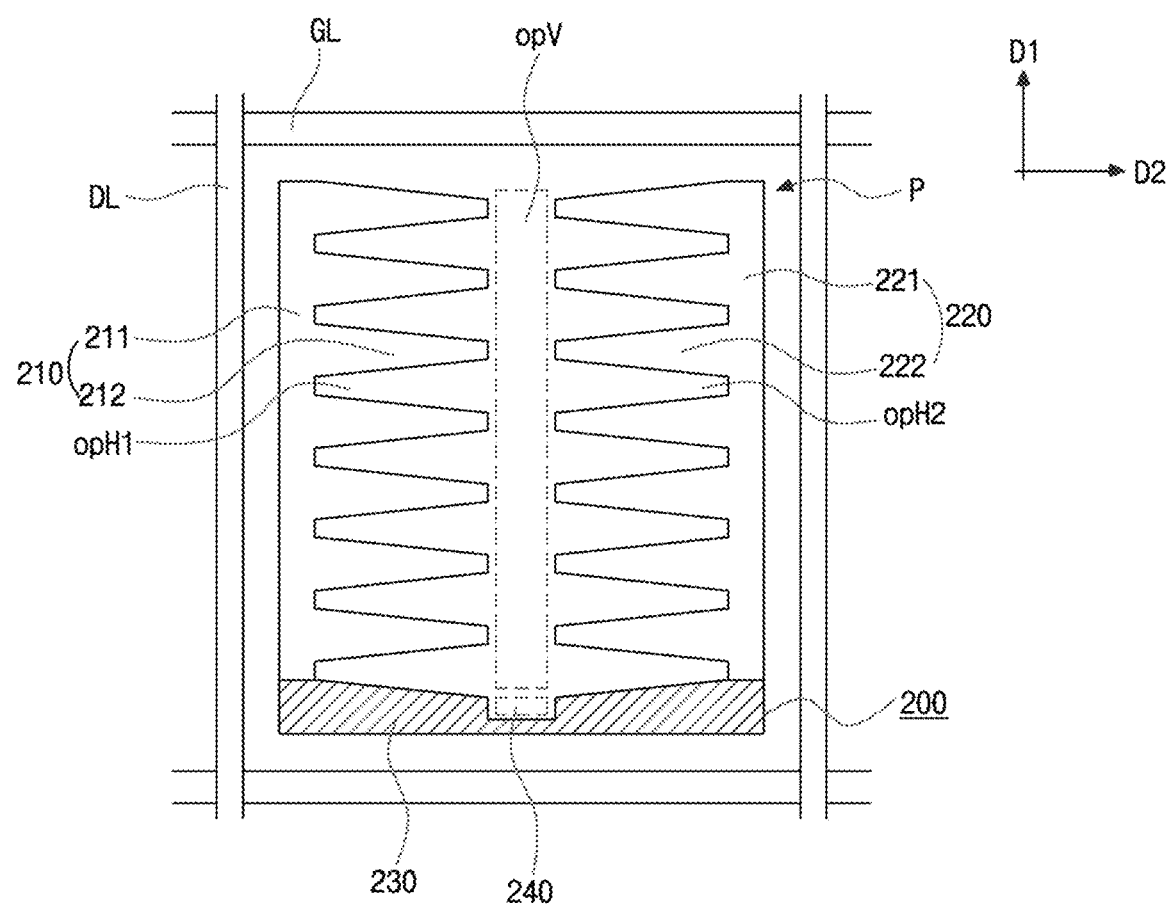
FIG. 5 is a plan view illustrating a second electrode of an LCD device according to a second aspect of the present disclosure.

FIG. 5 is a plan view illustrating a second electrode of an LCD device according to a second aspect of the present disclosure.

Referring to FIG. 5, a data line DL extending along a first direction D1 and a gate line GL extending along a second direction D2 crossing the first direction D1 may define a pixel region P.

A second electrode 200 may be formed in each pixel region P, and may include a first rib electrode 210, a second rib electrode 220 and a connection electrode 230.

The first rib electrode 210 may include a first vertical electrode 211 and a plurality of first horizontal electrodes 212, and ends of the plurality of first horizontal electrodes 212 may be connected to the first vertical electrode 211.

The first vertical electrode 211 may extend along the first direction D1, and the first horizontal electrodes 212 may extend along the second direction D2.

A plurality of first horizontal openings opH1 may be formed between the plurality of first horizontal electrodes 212. The plurality of first horizontal openings opH1 may extend along the second direction D2.

The first vertical electrode 211 may have a rectangular bar shape, and the plurality of first horizontal electrodes 212 may each have a tapered shape (or trapezoidal shape). Thus, the plurality of first horizontal openings opH1 may each have a tapered shape (or trapezoidal shape).

Because of the electrode structure having the tapered shape, a length of a side of the first horizontal electrode 212 which is connected to the first vertical electrode 211 may be greater or less than a length of an opposing side of the first horizontal electrode 212 which is far from the first vertical electrode 211.

The second rib electrode 220 may include a second vertical electrode 221 and a plurality of second horizontal electrodes 222, and ends of the plurality of second horizontal electrodes 222 may be connected to the second vertical electrode 221.

The second vertical electrode 221 may extend along the first direction D1, and the second horizontal electrodes 222 may extend along the second direction D2.

A plurality of second horizontal openings opH2 may be formed between the plurality of second horizontal electrodes 222. The plurality of second horizontal openings opH2 may extend along the second direction D2.

The second vertical electrode 221 may have a rectangular bar shape, and the plurality of second horizontal electrodes 222 may each have a tapered shape (or trapezoidal shape). Thus, the plurality of second horizontal openings opH2 may each have a tapered shape (or trapezoidal shape).

Because of the electrode structure having the tapered shape, a length of a side of the second horizontal electrode 222 which is connected to the second vertical electrode 221 may be greater or less than a length of an opposing side of the second horizontal electrode 222 which is far from the second vertical electrode 221.

Each one of the plurality of first horizontal electrodes 212 may be arranged to face corresponding one of the plurality of second horizontal electrodes 222. Accordingly, each one of the plurality of first horizontal openings opH1 may be arranged to face corresponding one of the plurality of second horizontal openings opH2.

A vertical opening opV may be formed between the plurality of first horizontal electrodes 212 and the plurality of second horizontal electrodes 222. The vertical opening opV may extend along the first direction D1.

The first rib electrode 210 and the second rib electrode 220 may be symmetrical with respect to the vertical opening opV as a center axis for symmetry.

The connection electrode 230 may be located between the first rib electrode 210 and the second rib electrode 220.

The connection electrode 230 may be connected to an end of the first vertical electrode 211 and an end of the second vertical electrode 221. The connection electrode 230 may be connected to the drain electrode (15 of FIG. 1) of the thin film transistor (T of FIG. 1) through the drain contact hole (dch of FIG. 1).

In FIG. 5, the connection electrode 230 located at a lower-side portion of the pixel region P is shown by way of example. However, the connection electrode 230 may be located at an upper-side portion of the pixel region P. Further, the first vertical electrode 211 and the second vertical electrode 221 may be formed to extend along the second direction D2, and in this case, the connection electrode 230 may be located at a left-side or right-side portion of the pixel region P to connect the first vertical electrode 211 with the second vertical electrode 221.

A hole 240 may be formed in the connection electrode 230. The hole 240 may be located at a region adjacent to the vertical opening opV.

The hole 240 may be connected to the vertical opening opV, and may have one of various shapes, for example, a rectangular shape, trapezoidal shape, triangular shape, other polygonal shape, circular shape, semicircular shape, or a geometrical shape having rounded corners or angular corners.

Like the first aspect, in the second aspect, due to a declination line formed over the vertical opening opV, a restoration force of liquid crystal molecules may increase, and thus a response speed may be improved. Further, due to the hole 240, the declination line being biased toward the first or second rib electrode 210 or 220 may be prevented, and thus a restoration force may remain constant.

Figure 6:
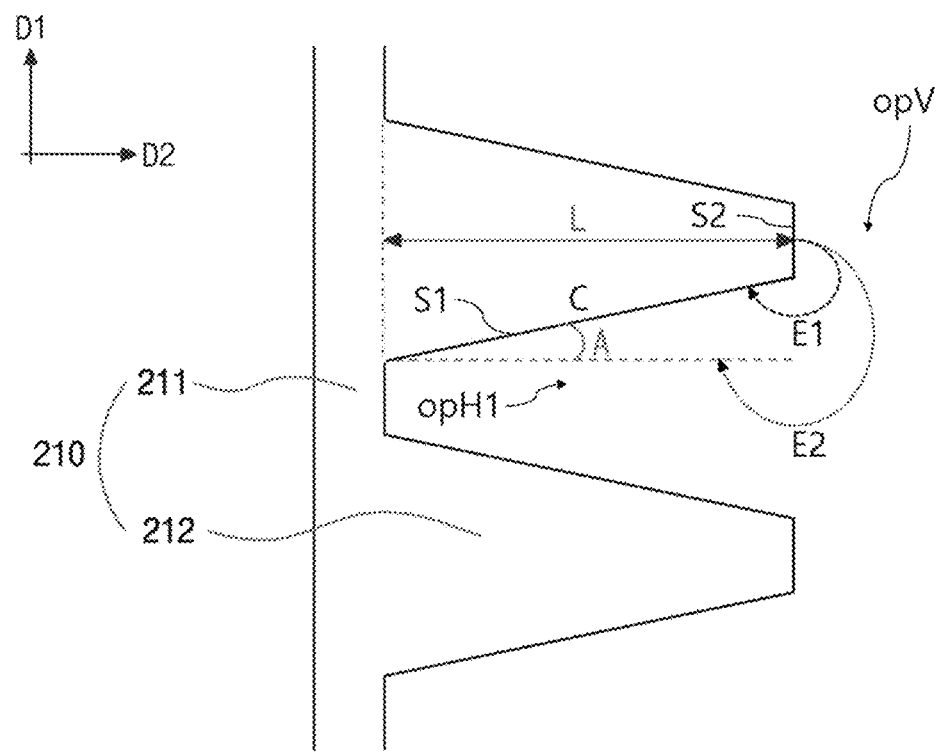
FIG. 6 is a view illustrating a production range of electric field for a length and an angle of a horizontal electrode according to a second aspect of the present disclosure.

FIG. 6 is a view illustrating a production range of electric field for a length and an angle of a horizontal electrode according to a second aspect of the present disclosure.

In this aspect, the first and second horizontal electrodes may have a tapered shape. In this regard, as shown in FIG. 6, a side S1 of the first horizontal electrode 212 adjacent to the first horizontal opening opH1 may make an angle A over 0° with the second direction D2. The second horizontal electrode (222 of FIG. 5) may have the same configuration as the first horizontal electrode 212.

An electric field produced at an end S2 of the first horizontal electrode 212 adjacent to the vertical opening opV may be closer (or shorter) to the side S1 of the first horizontal electrode 212 as the angle A is greater. In this regard, as shown in FIG. 6, an electric field E1 produced when the angle A is a predetermined degrees greater than 0° may reach the side S1 closer (or shorter) than an electric field E2 produced when the angle A is 0°.

Accordingly, the electric field E1 produced at the end S2 when the angle A is greater than 0° may propagate (or travel) farther from the end S2 than the electric field E2, which has an intensity of the electric field E1, produced at the end S2 when the angle A is 0°, and a possibility that the electric field E1 expands up to a center region C of the first horizontal electrode 212 may increase. As a length L is shorter, a distance from the end S2 to the center region C is shorter, and thus the electric field E1 produced at the end S2 may easily expand up to the center region C.

The above-described matter that the electric field E produced at the end S2 may expand up to the center region C as the first horizontal electrode 212 increases in the angle A and decreases in the length L may be applied equally to the second horizontal electrode 222.

The electric field E1 expanding up to the center region C may serve to maintain the declination line over the vertical opening opV so that the declination line being biased may be prevented. Thus, a reduction of a restoration force of liquid crystal molecules may be prevented, and thus a response speed may be stably secured.

Figure 7:
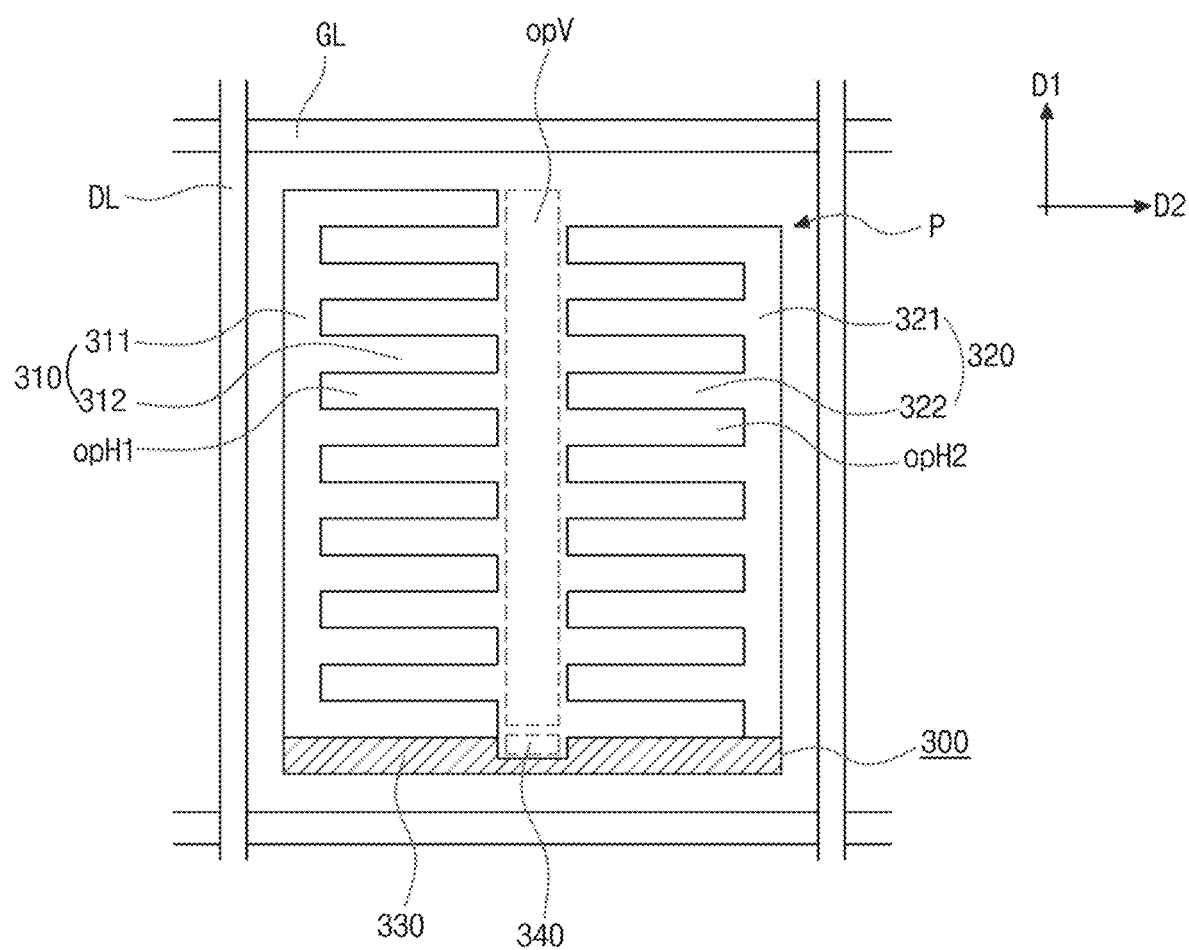
FIG. 7 is a plan view illustrating a second electrode of an LCD device according to a third aspect of the present disclosure.

FIG. 7 is a plan view illustrating a second electrode of an LCD device according to a third aspect of the present disclosure.

Referring to FIG. 7, a data line DL extending along a first direction D1 and a gate line GL extending along a second direction D2 crossing the first direction D1 may define a pixel region P.

A second electrode 300 may be formed in each pixel region P, and may include a first rib electrode 310, a second rib electrode 320 and a connection electrode 330.

The first rib electrode 310 may include a first vertical electrode 311 and a plurality of first horizontal electrodes 312, and ends of the plurality of first horizontal electrodes 312 may be connected to the first vertical electrode 311.

The first vertical electrode 311 may extend along the first direction D1, and the first horizontal electrodes 312 may extend along the second direction D2.

A plurality of first horizontal openings opH1 may be formed between the plurality of first horizontal electrodes 312. The plurality of first horizontal openings opH1 may extend along the second direction D2.

The first vertical electrode 311 and the plurality of first horizontal electrodes 312 may each have a rectangular bar shape. Thus, the plurality of first horizontal openings opH1 may each have a rectangular bar shape.

The second rib electrode 320 may include a second vertical electrode 321 and a plurality of second horizontal electrodes 322, and ends of the plurality of second horizontal electrodes 322 may be connected to the second vertical electrode 321.

The second vertical electrode 321 may extend along the first direction D1, and the second horizontal electrodes 322 may extend along the second direction D2.

A plurality of second horizontal openings opH2 may be formed between the plurality of second horizontal electrodes 322. The plurality of second horizontal openings opH2 may extend along the second direction D2.

The second vertical electrode 321 and the plurality of second horizontal electrodes 322 may each have a rectangular bar shape. Thus, the plurality of second horizontal openings opH2 may each have a rectangular bar shape.

Each one of the plurality of first horizontal electrodes 312 may be arranged to face corresponding one of the plurality of second horizontal openings opH2. Accordingly, each one of the plurality of second horizontal electrodes 322 may be arranged to face corresponding one of the plurality of first horizontal openings opH1.

A vertical opening opV may be formed between the plurality of first horizontal electrodes 312 and the plurality of second horizontal openings opH2 and between the plurality of second horizontal electrodes 322 and the plurality of first horizontal openings opH1. The vertical opening opV may extend along the first direction D1.

The first rib electrode 310 and the second rib electrode 320 may be configured such that the first horizontal electrodes 312 and the second horizontal electrodes 322 are arranged alternately with respect to the vertical opening opV as a center axis.

The connection electrode 330 may be located between the first rib electrode 310 and the second rib electrode 320.

The connection electrode 330 may be connected to the first vertical electrode 311 and the second vertical electrode 321. The connection electrode 330 may be connected to the drain electrode (15 of FIG. 1) of the thin film transistor (T of FIG. 1) through the drain contact hole (dch of FIG. 1).

In FIG. 7, the connection electrode 330 located at a lower-side portion of the pixel region P is shown by way of example. However, the connection electrode 330 may be located at an upper-side portion of the pixel region P. Further, the first vertical electrode 311 and the second vertical electrode 321 may be formed to extend along the second direction D2, and in this case, the connection electrode 330 may be located at a left-side or right-side portion of the pixel region P to connect the first vertical electrode 311 with the second vertical electrode 321.

A hole 340 may be formed in the connection electrode 330. The hole 340 may be located at a region adjacent to the vertical opening opV.

The hole 340 may be connected to the vertical opening opV, and may have one of various shapes, for example, a rectangular shape, trapezoidal shape, triangular shape, other polygonal shape, circular shape, semicircular shape, or a geometrical shape having rounded corners or angular corners.

Like the first aspect, in the third aspect, due to a declination line formed over the vertical opening opV, a restoration force of liquid crystal molecules may increase, and thus a response speed may be improved. Further, due to the hole 340, the declination line being biased toward the first or second rib electrode 310 or 320 may be prevented, and thus a restoration force may remain constant.

Figure 8:
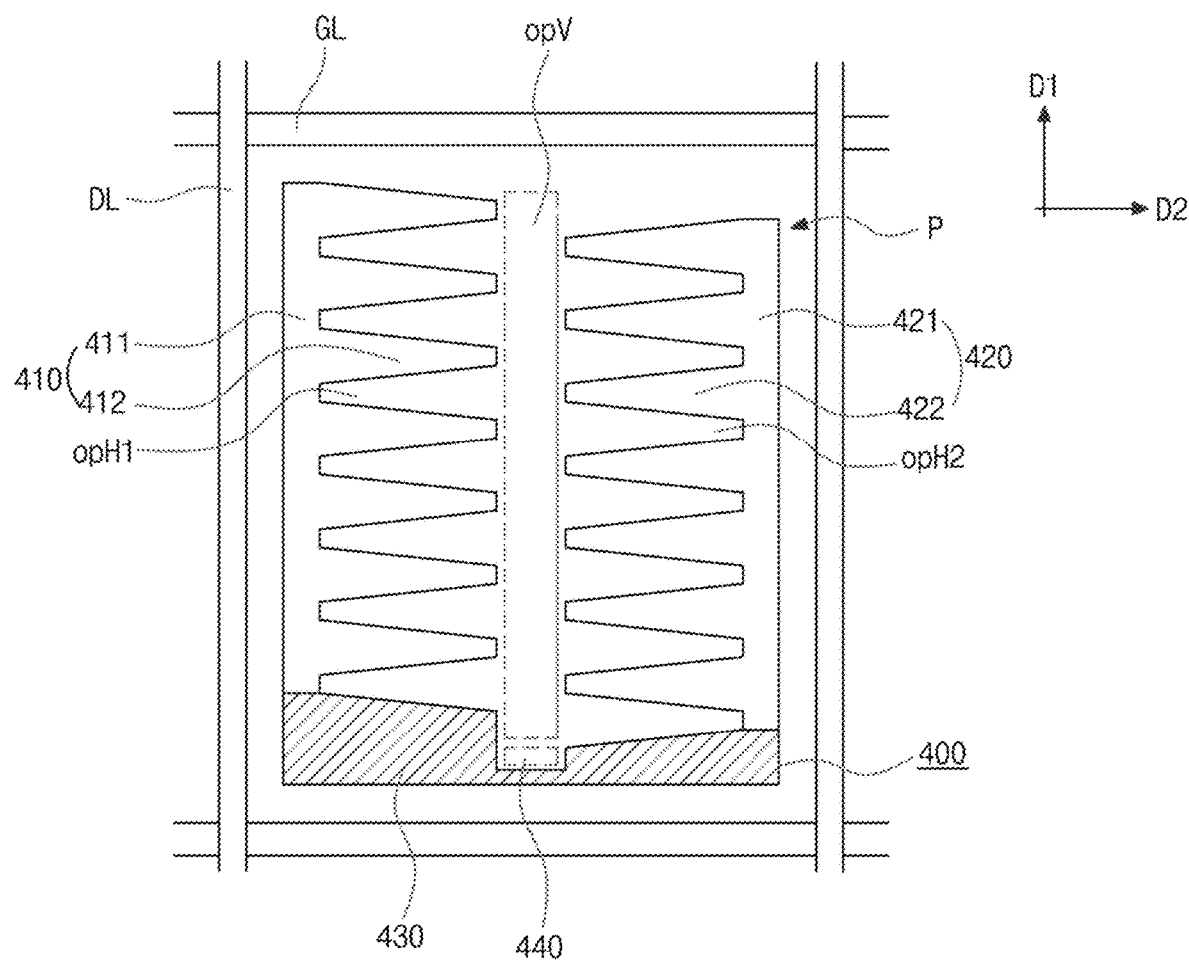
FIG. 8 is a plan view illustrating a second electrode of an LCD device according to a fourth aspect of the present disclosure.

FIG. 8 is a plan view illustrating a second electrode of an LCD device according to a fourth aspect of the present disclosure.

Referring to FIG. 8, a data line DL extending along a first direction D1 and a gate line GL extending along a second direction D2 crossing the first direction D1 may define a pixel region P.

A second electrode 400 may be formed in each pixel region P, and may include a first rib electrode 410, a second rib electrode 420 and a connection electrode 430.

The first rib electrode 410 may include a first vertical electrode 411 and a plurality of first horizontal electrodes 412, and ends of the plurality of first horizontal electrodes 412 may be connected to the first vertical electrode 411.

The first vertical electrode 411 may extend along the first direction D1, and the first horizontal electrodes 412 may extend along the second direction D2.

A plurality of first horizontal openings opH1 may be formed between the plurality of first horizontal electrodes 412. The plurality of first horizontal openings opH1 may extend along the second direction D2.

The first vertical electrode 411 may have a rectangular bar shape, and the plurality of first horizontal electrodes 412 may each have a tapered shape (or trapezoidal shape). Thus, the plurality of first horizontal openings opH1 may each have a tapered shape (or trapezoidal shape).

Because of the electrode structure having the tapered shape, a length of a side of the first horizontal electrode 412 which is connected to the first vertical electrode 411 may be greater or less than a length of an opposing side of the first horizontal electrode 412 which is far from the first vertical electrode 411.

The second rib electrode 420 may include a second vertical electrode 421 and a plurality of second horizontal electrodes 422, and ends of the plurality of second horizontal electrodes 422 may be connected to the second vertical electrode 421.

The second vertical electrode 421 may extend along the first direction D1, and the second horizontal electrodes 422 may extend along the second direction D2.

A plurality of second horizontal openings opH2 may be formed between the plurality of second horizontal electrodes 422. The plurality of second horizontal openings opH2 may extend along the second direction D2.

The second vertical electrode 421 may have a rectangular bar shape, and the plurality of second horizontal electrodes 422 may each have a tapered shape (or trapezoidal shape). Thus, the plurality of second horizontal openings opH2 may each have a tapered shape (or trapezoidal shape).

Because of the electrode structure having the tapered shape, a length of a side of the second horizontal electrode 422 which is connected to the second vertical electrode 421 may be greater or less than a length of an opposing side of the second horizontal electrode 422 which is far from the second vertical electrode 421.

Each one of the plurality of first horizontal electrodes 412 may be arranged to face corresponding one of the plurality of second horizontal openings opH2. Accordingly, each one of the plurality of second horizontal electrodes 422 may be arranged to face corresponding one of the plurality of first horizontal openings opH1.

A vertical opening opV may be formed between the plurality of first horizontal electrodes 412 and the plurality of second horizontal openings opH2 and between the plurality of second horizontal electrodes 422 and the plurality of first horizontal openings opH1. The vertical opening opV may extend along the first direction D1.

The first rib electrode 410 and the second rib electrode 420 may be configured such that the first horizontal electrodes 412 and the second horizontal electrodes 422 are arranged alternately with respect to the vertical opening opV as a center axis.

The connection electrode 430 may be located between the first rib electrode 410 and the second rib electrode 420.

The connection electrode 430 may be connected to the first vertical electrode 411 and the second vertical electrode 421. The connection electrode 430 may be connected to the drain electrode (15 of FIG. 1) of the thin film transistor (T of FIG. 1) through the drain contact hole (dch of FIG. 1).

In FIG. 8, the connection electrode 430 located at a lower-side portion of the pixel region P is shown by way of example. However, the connection electrode 430 may be located at an upper-side portion of the pixel region P. Further, the first vertical electrode 411 and the second vertical electrode 421 may be formed to extend along the second direction D2, and in this case, the connection electrode 430 may be located at a left-side or right-side portion of the pixel region P to connect the first vertical electrode 411 with the second vertical electrode 421.

A hole 440 may be formed in the connection electrode 430. The hole 440 may be located at a region adjacent to the vertical opening opV.

The hole 440 may be connected to the vertical opening opV, and may have one of various shapes, for example, a rectangular shape, trapezoidal shape, triangular shape, other polygonal shape, circular shape, semicircular shape, or a geometrical shape having rounded corners or angular corners.

Like the first aspect, in the fourth aspect, due to a declination line formed over the vertical opening opV, a restoration force of liquid crystal molecules may increase, and thus a response speed may be improved. Further, due to the hole 440, the declination line being biased toward the first or second rib electrode 410 or 420 may be prevented, and thus a restoration force may remain constant.

Figure 9:
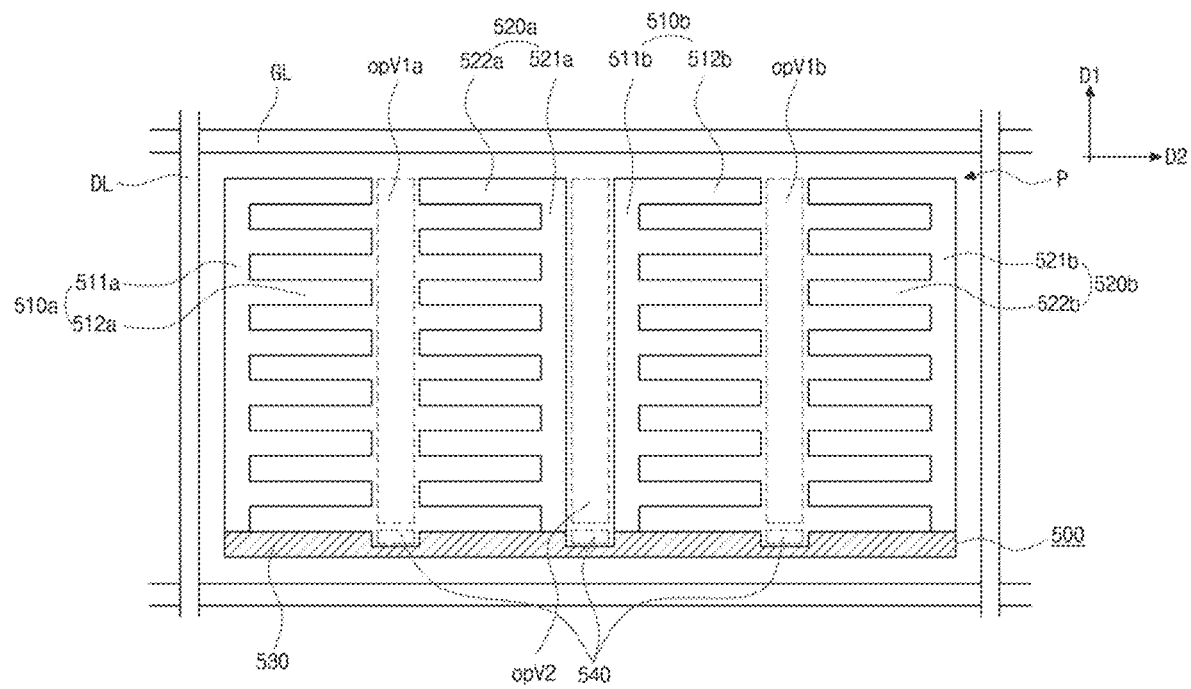
FIG. 9 is a plan view illustrating a second electrode of an LCD device according to a fifth aspect of the present disclosure.

FIG. 9 is a plan view illustrating a second electrode of an LCD device according to a fifth aspect of the present disclosure.

Referring to FIG. 9, a data line DL extending along a first direction D1 and a gate line GL extending along a second direction D2 crossing the first direction D1 may define a pixel region P.

In this aspect, the first and second rib electrodes (110 and 120 of FIG. 2) of the second electrode (100 of FIG. 2) of the first aspect may be arranged alternately and repeatedly along the second direction D2.

Alternately, even though not shown in the drawings, the first and second rib electrodes of the second electrode of the second, third or fourth aspect may be arranged alternately and repeatedly along the second direction D2.

In FIG. 9, a configuration that two first rib electrodes 510a and 510b and two second rib electrodes 520a and 520b included in one pixel region P is shown by way of example. Alternatively, three or more first rib electrodes and three or more second rib electrodes may be included in one pixel region P A first vertical opening opV1a may be formed at a region between a plurality of first horizontal electrodes 512a and a plurality of second horizontal electrodes 522a which face each other, and the first vertical opening opV1a may extend along the first direction D1. A first vertical opening opV1b may be formed at a region between a plurality of first horizontal electrodes 512b and a plurality of second horizontal electrodes 522b which face each other, and the first vertical opening opV1b may extend along the first direction D1.

A second vertical opening opV2 may be formed at a region between a first vertical electrode 511b and a second vertical electrode 521a which are adjacent to each other, and the second vertical opening opV2 may extend along the first direction D1.

The connection electrode 530 may be located between the first rib electrode 510a and the second rib electrode 520a, between the first rib electrode 510b and the second rib electrode 520b, and between the first rib electrode 510b and the second rib electrode 520a which are adjacent to each other.

The connection electrode 530 may be connected to first vertical electrodes 511a and 511b and second vertical electrodes 521a and 521b. The connection electrode 530 may be connected to the drain electrode (15 of FIG. 1) of the thin film transistor (T of FIG. 1) through the drain contact hole (dch of FIG. 1).

In FIG. 9, the connection electrode 530 located at a lower-side portion of the pixel region P is shown by way of example. However, the connection electrode 530 may be located at an upper-side portion of the pixel region P. Further, the first vertical electrodes 511a and 511b and the second vertical electrodes 521a and 521b may be formed to extend along the second direction D2, and in this case, the connection electrode 530 may be located at a left-side or right-side portion of the pixel region P to connect the first vertical electrodes 511a and 511b with the second vertical electrodes 521a and 521b.

Holes 540 may be formed in the connection electrode 530. The holes 540 may be respectively located at regions adjacent to the first vertical openings opV1a and opV1b and the second vertical opening opV2.

The holes 540 may be respectively connected to the first vertical openings opV1a and opV1b and the second vertical opening opV2, and may each have one of various shapes, for example, a rectangular shape, trapezoidal shape, triangular shape, other polygonal shape, circular shape, semicircular shape, or a geometrical shape having rounded corners or angular corners.

In this aspect, an electric field over each of the first vertical openings opV1a and opV1b may be in equilibrium to form a declination line where an alignment of liquid crystal molecules does not change. Also, an electric field over the second vertical opening opV2 may be in equilibrium because directions of electric fields produced by the first rib electrode 510b and the second rib electrode 520a are opposite to each other, and thus a declination line may be formed at the second vertical opening opV2.

As such, the plural declination lines may be formed in one pixel region P to improve a restoration force, a falling time when liquid crystal molecules return to an initial alignment state may be reduced.

Further, the hole 540 may be formed to increase intensity and region of an electric field, and thus the declination lines adjacent to the connection electrode 530 being biased toward the first rib electrodes 510a and 510b or the second rib electrodes 520a and 520b may be prevented. Thus, a restoration force of liquid crystal molecules may remain constant even when a driving time increases. Accordingly, a falling time to return to an initial alignment state may be reduced effectively, and a response speed may be improved.

Figure 10:
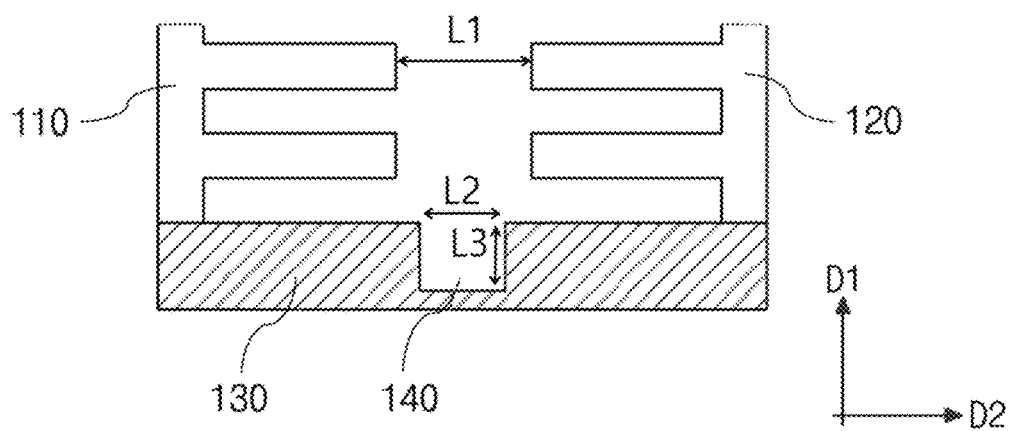
FIG. 10 is a view illustrating a distance between first and second rib electrodes and width and depth of a hole in a second electrode of an LCD device according to an aspect of the present disclosure.

FIG. 10 is a view illustrating a distance between first and second rib electrodes and width and depth of a hole in a second electrode of an LCD device according to an aspect of the present disclosure.

In the aspect of the present disclosure, in order to maintain an equilibrium of electric fields produced by the first and second rib electrodes 110 and 120 and to prevent a bias of a declination line, a ratio (L1/L2) of a distance L1 between the first and second rib electrode 110 and 120 to a width L2 as a length of the hole 140 along the second direction D2 may be in a range of 0.2 to 10, and a ratio (L2/L3) of the width L2 of the hole 140 to a depth L3 as a length of the hole 140 along the first direction D1 may be in a range of 0.25 to 10.

The distance L1 may be in a range of 1 um to 5 um. When the length L1 is in a range of 3 um to 5 um, a light transmittance may not be reduced.

The width L2 may be in a range of 0.5 um to 5 um. When the width L2 is in a range of 2 um to 5 um, an electric field may expand up to center regions of first and second horizontal openings, and thus an intensity of an electric field may increase.

Accordingly, a ratio (L1/L2) of the distance L1 to the width L2 may be in a range of 0.6 to 2.5.

The depth L3 may be in a range of 0.5 um to 4 um. A declination line may stably remain when the depth L3 may be 1.5 um or greater. Accordingly, the depth L3 may be in a range of 1.5 um to 4 um.

Thus, a ratio (L2/L3) of the width L2 to the depth L3 may be in a range of 0.5 to 3.3.

Figure 11A:
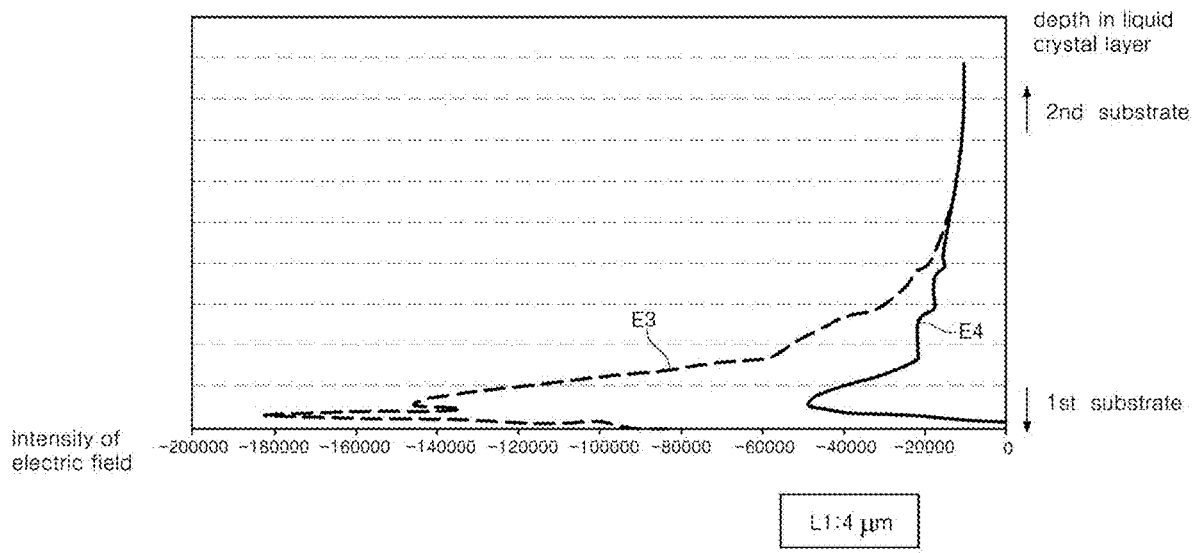
FIG. 11A is a view illustrating an intensity of electric field to a position over a second electrode including no hole.
Figure 11B:
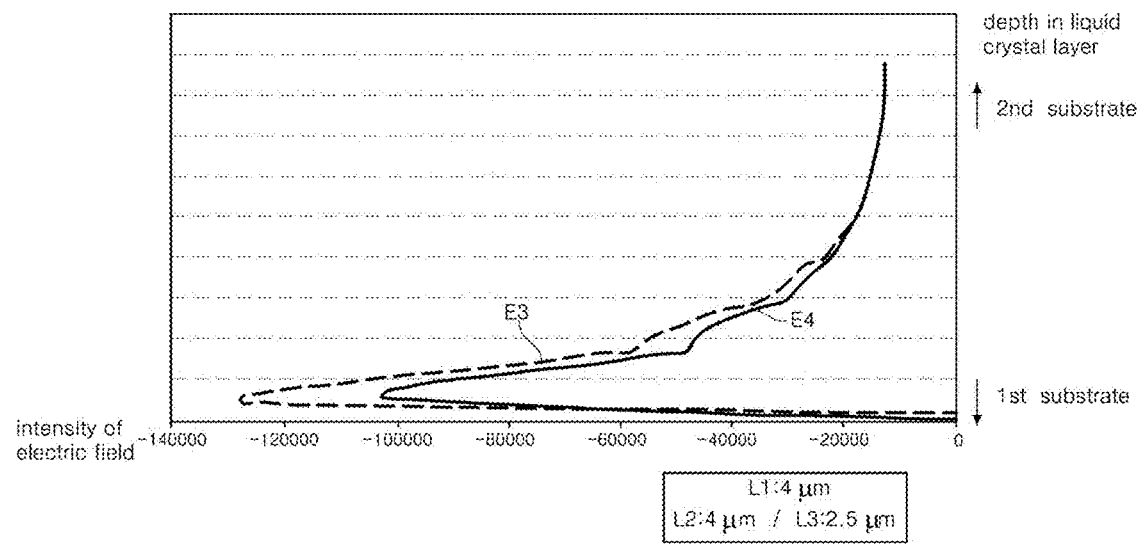
FIG. 11B is a view illustrating an intensity of electric field to a position over a second electrode including a hole according to the present disclosure.

FIG. 11A is a view illustrating an intensity of electric field to a position over a second electrode including no hole, and FIG. 11B is a view illustrating an intensity of electric field to a position over a second electrode including a hole according to the present disclosure.

FIGS. 11A and 11B, a horizontal axis indicates an intensity of electric field, in which an electric field increases toward a left. A vertical axis indicates a depth (or height) in a liquid crystal layer, in which a first substrate and a second electrode are closer in a lower direction while a second substrate is closer in an upper direction.

In a case that a connection electrode includes no hole, as shown in FIG. 11A, compared with an electric field E3 over the vertical opening adjacent to the first and second rib electrodes, an intensity of an electric field E4 over the vertical opening adjacent to the connection electrode is remarkably lower as the second electrode is closer.

Since the intensity of the electric field E4 over the vertical opening adjacent to the connection electrode is lower, a declination line does not remain constant for a driving time, and thus a restoration force of liquid crystal molecules is reduced.

In the aspect of the present disclosure shown in FIG. 11B, a configuration that the distance L1 between the first and second rib electrodes is 4 um, the width L2 of the hole is 4 um and the depth L3 of the hole is 2.5 um is used by way of example.

An intensity of an electric field E4 over the vertical opening adjacent to the connection electrode is close to an intensity of an electric field E1 over the vertical opening adjacent to the first and second rib electrodes. Thus, an electric field over a certain intensity can be produced even when the second electrode is closer.

Thus, a declination line stably remains for a driving time and a restoration force of liquid crystal molecules is improved, and thus a response speed of the LCD device is improved.

As described above, in the LCD device of the present disclosure, the vertical opening is formed between the first and second rib electrodes of the second electrode connected to the thin film transistor. Accordingly, a restoration force of liquid crystal molecules can be improved by a declination line, and thus a falling time can be reduced and a response speed can increase.

Further, the hole is formed in the connection electrode connecting the first and second rib electrodes. Accordingly, an electric field over the vertical opening adjacent to the hole can expand, and thus a bias of the declination line can be prevented to maintain a restoration force of liquid crystal molecules and a phenomenon that a response speed is reduced as a driving time increases can be prevented.

It will be apparent to those skilled in the art that various modifications and variations can be made in a display device of the present disclosure without departing from the sprit or scope of the disclosure. Thus, it is intended that the present disclosure covers the modifications and variations of this disclosure provided they come within the scope of the appended claims and their equivalents.

What is claimed is:

1. A liquid crystal display device, comprising:
   a first substrate and a second substrate facing each other;
   a thin film transistor in a pixel region on the first substrate;
   a first electrode on the thin film transistor; and
   a second electrode on the first electrode and connected to the thin film transistor,
   wherein the second electrode includes a first rib electrode and a second rib electrode,
   wherein the first rib electrode and the second rib electrode are connected by a connection electrode,
   wherein a vertical opening is disposed between the first rib electrode and the second rib electrode and along a first direction,
   wherein the connection electrode includes a hole at a region adjacent to the vertical opening, and
   wherein, in a plan view, one side of the connection electrode has a recess, and the hole is accommodated within the recess.

2. The device of claim 1, wherein the first and second rib electrodes are disposed in the pixel region,
   wherein the first rib electrodes and the plurality of second rib electrodes are arranged to alternate repeatedly in a second direction crossing the first direction, and are connected by the connection electrode,
   wherein the vertical opening is disposed between the first rib electrodes and the second rib electrodes, and
   wherein the connection electrode includes a plurality of holes at a plurality of regions adjacent to the plurality of vertical openings, respectively.

3. The device of claim 1, wherein the first rib electrode and the second rib electrode are separated by 3 um to 5 um.

4. The device of claim 1, wherein a width of the hole in a second direction crossing the first direction is 2 um to 5 um.

5. The device of claim 1, wherein a width of the hole in the first direction is 1.5 um to 4 um.

6. The device of claim 1, wherein the hole is connected to the vertical opening.

7. The device of claim 1, wherein the first rib electrode includes a first vertical electrode and a plurality of first horizontal electrodes connected to the first vertical electrode, and the second rib electrode includes a second vertical electrode and a plurality of second horizontal electrodes connected to the second vertical electrode.

8. The device of claim 7, wherein the first and second horizontal electrodes have a rectangular shape.

9. The device of claim 7, wherein the first and second horizontal electrodes have a tapered shape,
   wherein a length of a side of the first horizontal electrode at a region where the first horizontal electrode is connected to the first vertical electrode is greater than a length of a side of the first horizontal electrode at a region where the first horizontal electrode is adjacent to the vertical opening, and
   wherein a length of a side of the second horizontal electrode at a region where the second horizontal electrode is connected to the second vertical electrode is greater than a length of a side of the second horizontal electrode at a region where the second horizontal electrode is adjacent to the vertical opening.

10. The device of claim 7, wherein the first horizontal electrodes faces the second horizontal electrodes.

11. The device of claim 7, wherein the plurality of first horizontal electrodes have a plurality of first horizontal openings therebetween, and the plurality of second horizontal electrodes have a plurality of second horizontal openings therebetween.

12. The device of claim 11, wherein the first horizontal electrode faces the plurality of second horizontal openings, and the second horizontal electrode faces the plurality of first horizontal openings.

* * * * *